May 1, 1951     R. SACHTLEBER     2,551,169

SINE BAR

Filed March 29, 1949

RUDOLPH SACHTLEBER
INVENTOR.

BY

Patented May 1, 1951

2,551,169

UNITED STATES PATENT OFFICE 2,551,169

SINE BAR

Rudolph Sachtleber, East Orange, N. J.

Application March 29, 1949, Serial No. 84,219

4 Claims. (Cl. 33—174)

This invention relates generally to a tool for angular measurement and in particular to an improved sine-bar for measuring angles accurately or for locating work at a given angle.

In the past it has been known in the machine shop art that a sine-bar which was an accurate straight edge having two hardened plugs or two openings therein could be used in conjunction with a straight edge or true surface for measuring angles or for locating work to a given angle in a given machine for the purposes of cutting or grinding.

For the purpose of reducing the amount of calculation and for increasing the accuracy thereof it was customary to fix the sine-bar to a constant length for example five inches or ten inches and to use accurate measuring instruments such as Johanssen blocks in the setting of the sine-bar to the correct angle.

The present invention embodies an improved sine-bar wherein it is not necessary to utilize the sine-bar in conjunction with a straight edge when measuring an angle and wherein the measuring or setting of work at a given angle can be accurately performed by use of a micrometer and a parallel.

Accordingly, it is an object of the present invention to provide a measuring instrument for setting work accurately in a given machine for the purpose of cutting and grinding.

It is another object of the present invention to provide a measuring instrument to determine angles accurately.

It is another object of the present invention to provide a sine-bar having a swinging member which can be fixed to secure a desired angular measurement.

It is a further object of the present invention to provide a sine-bar which is constructed to be fixed at a given angle by setting it with a micrometer.

With these and other objects in view, as may appear from the accompanying specification, the invention consists of various features of construction and combination of parts, which will be first described in connection with the accompanying drawings showing an improved sine-bar of a preferred form embodying the invention, and the features forming the invention will be specifically pointed out in the claims.

Figure 1:
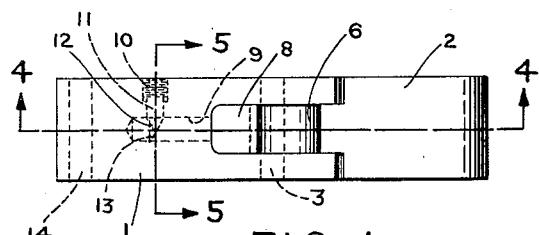
Figure 1 is a bottom view of the invention.

Referring more particularly to the drawings, the improved sine-bar comprises a main body portion 1, and a swinging arm member 2 rotatably attached thereto by a press fitted pin 3 to form a substantially flat elongated rectangular construction as shown in Figure 1 of the drawings.

Figure 3:
Figure 3 is an end view of the invention.

The main body portion 1 is milled so as to form an offset portion 4 at one end, and a centrally located rectangular window like opening 5 adjacent said offset portion 4. Swinging member 2 which is a flat rectangular side piece is ground to snugly engage the offset portion 4 and is provided with a tongue-like extension 6 which fits the rectangular opening 5 clearly shown in Figures 1 and 3 of the drawings. This also serves as a bearing-like surface when the press fitted pin 3 is passed through the main body member 1 and the tongue member 6 to connect the swinging member 2 and main body portion 1 and to form a pivoting arrangement whereby the swinging member 2 may be rotated from said snug engagement with the main body portion 1 with a minimum of sidewise movement between the two members to provide greater accuracy in the use of the improved sine-bar.

Figure 2:
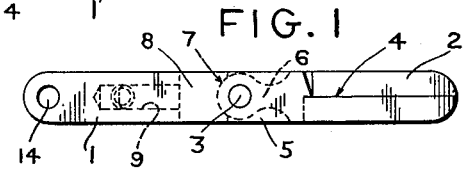
Figure 2 is a side view of the invention.
Figures 4, 5:
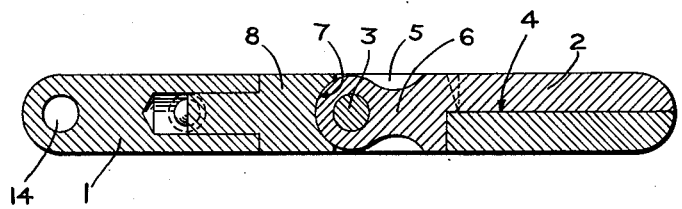
Figure 4 is a cross-section through the line 4—4 of Figure 1.
Figure 5 is a cross-section through the line 5—5 of Figure 1.
Figure 6:
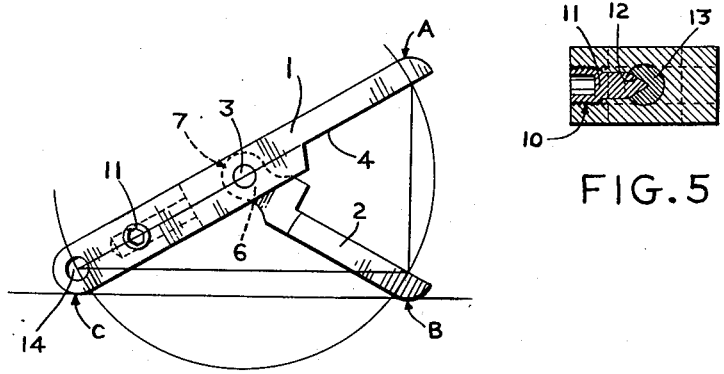
Figure 6 is a side view showing the invention forming an angle.

The tongue 6 has a curved exterior 7 which is in surface-to-surface contact with a locking shoe 8 having curved portions which engages said curved exterior 8 clearly shown in Figures 2 and 4 of the drawings. The locking shoe 8 is slidably mounted in a milled recess 9 communicating with the rectangular opening 5 in the main body portion. A threaded opening 10 in the main body portion 1 communicates in turn with the milled recess 9 and has a threaded locking member 11 threadably connected therein. The threaded locking member 11 is provided with a cone-shaped elongation 12 which enters the milled recess 9 to contact a beveled portion 13 of the locking shoe 8, as is clearly shown in Figures 1 and 5 of the drawings. Thus when the threaded locking member 11 is turned into engagement with the locking shoe 8 the said locking shoe is moved outwardly against the rounded surface of the tongue 6 on the swinging arm 2, locking the said tongue 6 so that the swinging arm 2 may be held in any desired position as is indicated in Figure 6 of the drawings. It being understood that while this type of locking device is shown and described that other locking devices embodying the same idea may be utilized for this purpose.

The locking shoe 8 which contacts the rounded surface 7 of the tongue 6 is preferably made of metal which differs in alloying composition from that of the metal which comprises the tongue in order to increase the effect locking power between the locking shoe 8 and the swinging arm 2 to hold it in position.

At the other end of the main body portion 1 which is not milled a bore 14 or a plug or similar means is provided which is utilized for clamping or fixing the improved sine-bar in position when measuring or setting an angle as is hereinafter described.

For setting in an angle at which a piece of work will be cut or ground and in all other instances where the improved sine-bar will be utilized it is most convenient to have the sine-bar or a determinable portion thereof fixed at a given length, preferably five inches and to have the total thickness of the main body portion and the swinging member when closely fitted into the milled insert equal to a given constant to simplify the calculations which are performed from the measurements derived from the instrument.

Accordingly, for setting a piece of work at a given angle, the improved sine-bar must first be set to the given angle. This is accomplished by using a micrometer (not shown) which is opened to a predetermined distance calculated from the predetermined fixed length of the main body portion and the sine of the given angle desired which is derived from any set of natural sine and cosine tables available in engineering handbooks, plus the constant above mentioned which represents the thickness of the sine-bar, according to the equation:

Fixed length (5″) × sine of given angle + constant = micrometer setting

The improved sine-bar is grasped manually and the swinging member 2 opened until the main body portion 1 and the swinging arm 2 contact the micrometer setting at the points A and B as shown in Figure 6 of the drawings.

Once the sine-bar is set at the given angle it may be utilized to set the work sought to be milled or ground by clamping the sine-bar by means of the bore 14 in an angle rest (not shown) being certain to square the sine-bar across the points band C shown in Figure 6 of the drawings prior to clamping it in the angle rest. Once the sine-bar is positioned since the angle is set all that you need do is place the work to be milled or ground firmly against the sine-bar, clamp it in the angle rest too wherein it is immediately ready for the said milling or grinding at the given angle desired.

The measuring of an angle is essentially the reverse of this process, the work being first squared and clamped in the angle rest. The sine-bar is brought into contact with the surface to be measured at point C on the main body portion 1 so that the swinging arm 2 may also contact the surface being measured as hereinafter described. The main body portion 1 must be squared and parallel to the squared work which may be accomplished any number of ways but which is best done by lightly but movably clamping the main body portion 1 in the angle rest while in contact at point C with the surface being measured by means of the bore 14 or other means and thereafter moving the main body portion until it is so squared. Thereafter the main body portion is tightly and immovably clamped in the angle rest so that the swinging arm 2 may now be dropped into contact with the surface being measured at the point B as indicated in Figure 6 of the drawings. The swinging arm 2 is locked in position and the sine-bar removed from the angle rest to allow room to measure the distance across points A and B shown in Figure 6 with a micrometer. The angle is now determined by finding its sine from the equation $$\frac{\text{Micrometer setting} - \text{constant}}{\text{Fixed length (5″)}} = \text{sine of the angle}$$

Once the sine is secured the angle may be read by reference to any table of natural sines and cosines available.

While one form of the invention has been shown and described it will be understood that the invention is not to be limited to the specific construction or arrangement of parts shown but that they may be widely modified within the invention defined by the claims.

What is claimed is:

1. In a sine bar for angular measurement, an elongated main body portion having one end thereof reduced to form an offset portion, a window medially spaced in said main body portion and passing therethrough adjacent said offset having sides substantially perpendicular to the axial line thereof, a movable member pivotally mounted in said window for swinging movement relative to the main body portion and adapted to fit said offset portion when pivoted into contact with said main body, a bore formed in said main body communicating with said window, a locking shoe slidably mounted in said bore and extending into the window to contact the movable member, and movable threaded means extending into said bore to coact with the locking shoe for moving the locking shoe into locking contact with said movable member to fixedly set said movable member in any desired position.

2. In a sine bar for angular measurement as claimed in claim 1 wherein the end of said movable member mounted in said window includes, a tongue portion, said tongue portion in surface-to-surface engagement with the said sides of the window to provide minimum sidewise movement of the movable member relative to said main body portion.

3. In a sine bar for angular measurement as claimed in claim 1 wherein said locking shoe includes, an exterior portion adapted to slidably fit the window in said main body portion, and an extension beveled on the inner end thereof on said exterior portion to be slidably mounted in said bore.

4. In a sine bar for angular measurement, an elongated main body portion having one end thereof reduced to form an offset portion, a window medially spaced in said main body portion and passing therethrough adjacent said offset having sides substantially perpendicular to the axial line of the main body portion, a movable member pivotally mounted in said window for swinging movement relative to said main body portion and adapted to fit said offset portion when pivoted into contact with the main body portion, a tongue portion at the pivotal end of the movable member, said tongue portion in surface-to-surface engagement on the sides thereof with the said sides of said window to provide minimum sidewise movement of the movable member relative to the main body member, a bore formed in said body member and communicating with said window, a locking shoe, said locking shoe including, an exterior portion adapted to slidably fit said window and curved for contact with said tongue portion of the movable member, and an extension connected to said exterior portion slidably mounted in said bore and having a beveled portion on the inner end thereof, and movable threaded means extending into said bore to coact with said beveled portion of the extension to move the locking shoe into locking contact with the movable member to fixedly set the movable member in any desired position.

RUDOLPH SACHTLEBER.

REFERENCES CITED

The following references are of record in the file of this patent:

UNITED STATES PATENTS

| Number | Name | Date |
| --- | --- | --- |
| 672,213 | Holcomb | Apr. 16, 1901 |
| 708,533 | Cullman | Sept. 9, 1902 |
| 903,779 | Robins | Nov. 10, 1908 |
| 1,306,906 | Jaques | June 17, 1919 |
| 1,395,664 | Benson | Nov. 1, 1921 |
| 1,440,284 | Engstrom | Dec. 26, 1922 |
| 2,441,413 | Hassig | May 11, 1948 |

FOREIGN PATENTS

| Number | Country | Date |
| --- | --- | --- |
| 62,259 | Switzerland | Apr. 23, 1912 |
| 319,141 | Germany | Feb. 27, 1920 |